（12） United States Patent
Han

(10) Patent No.: US 9,015,734 B2
(45) Date of Patent: Apr. 21, 2015

(54) TURN TABLE FOR SPINDLE MOTOR AND SPINDLE MOTOR HAVING THE SAME

(71) Applicant: LG Innotek Co., Ltd., Seoul (KR)

(72) Inventor: Cheongun Han, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/029,370

(22) Filed: Sep. 17, 2013

(65) Prior Publication Data

US 2014/0020001 A1  Jan. 16, 2014

Related U.S. Application Data

(63) Continuation of application No. 13/307,851, filed on Nov. 30, 2011, now Pat. No. 8,566,853.

(30) Foreign Application Priority Data

Jan. 13, 2011  (KR) .................... 10-2011-0003569

(51) Int. Cl.
*G11B 17/03* (2006.01)
*G11B 17/028* (2006.01)
*G11B 19/20* (2006.01)

(52) U.S. Cl.
CPC ........ *G11B 17/0284* (2013.01); *G11B 17/0282* (2013.01); *G11B 19/2009* (2013.01)

(58) Field of Classification Search
USPC .................................................. 720/704–714
See application file for complete search history.

(56) References Cited

U.S. PATENT DOCUMENTS

| 4,539,614 | A | * | 9/1985 | Thompson ................. 360/99.02 |
| 4,847,826 | A | * | 7/1989 | Sakaguchi et al. ............ 720/723 |
| 5,933,408 | A | | 8/1999 | Park et al. |
| 6,108,294 | A | | 8/2000 | Iwanaga |
| 6,874,155 | B2 | | 3/2005 | Sogawa et al. |
| 2002/0044521 | A1 | * | 4/2002 | Sogawa et al. ................ 369/270 |
| 2005/0010943 | A1 | | 1/2005 | Ho |
| 2005/0071862 | A1 | | 3/2005 | Asabata |
| 2005/0097589 | A1 | | 5/2005 | Hara et al. |
| 2005/0223401 | A1 | | 10/2005 | Fukasawa |
| 2006/0064712 | A1 | * | 3/2006 | Kim .............................. 720/710 |
| 2006/0112404 | A1 | | 5/2006 | Hara |
| 2007/0199010 | A1 | | 8/2007 | Chen |
| 2007/0294713 | A1 | | 12/2007 | Yoon |
| 2010/0251272 | A1 | * | 9/2010 | Goto ............................. 720/604 |
| 2011/0035763 | A1 | | 2/2011 | Nakanishi et al. |

* cited by examiner

*Primary Examiner* — Adam B Dravininkas
(74) *Attorney, Agent, or Firm* — Saliwanchik, Lloyd & Eisenschenk

(57) ABSTRACT

A turn table for a spindle motor and a spindle motor having the turn table are provided, the turn table for a spindle motor according to an exemplary embodiment comprising a clamping plate configured to have a locking protrusion protruding from an inner surface of a first recess thereof, the first recess being concavely formed in an outer circumference of the clamping plate; and a turn-table body configured to have a second recess to receive the clamping plate, and a plurality of protrusions protruding from an inner surface defined by the second recess towards the first recess to lock the locking protrusion.

15 Claims, 4 Drawing Sheets

TURN TABLE FOR SPINDLE MOTOR AND SPINDLE MOTOR HAVING THE SAME

CROSS-REFERENCE TO RELATED APPLICATIONS

This application is a continuation of U.S. application Ser. No. 13/307,851, filed Nov. 30, 2011, which claims the benefit under 35 U.S.C.§119 of Korean Patent Application No. 10-2011-0003569, filed Jan. 13, 2011, which are hereby incorporated by reference in their entirety.

BACKGROUND

1. Field of the Invention

The present invention relates to a turn table for a spindle motor and a spindle motor having the turn table.

2. Description of Related Art

Recently, technical development of an optical disc drive (ODD) for recording or reading data in or from an optical disc is being conducted.

The ODD includes a spindle motor for rotating an optical disc, an optical pickup module for reading or recording data from or in the optical disc, and a stepping motor for moving the optical pickup module in a radial direction of the optical disc.

The spindle motor for rotating the optical disc includes a turn table coupled to a rotating shaft to support the optical disc. The turn table includes a clamping plate comprising a metallic plate. The clamping plate is attached to a magnet of a clamper disposed above the optical disc.

Conventionally, the clamping plate is stuck to the turn table using an adhesive. However, as detachable attachment of the clamper to the clamping plate is repetitively performed, the clamping plate may be undesirably separated from the turn table.

BRIEF SUMMARY

Exemplary aspects of the present disclosure are to substantially solve at least the above problems and/or disadvantages and to provide at least the advantages as mentioned below. Thus, the present invention is to provide a turn table for a spindle motor capable of inhibiting undesirable separation of a clamping plate, and a spindle motor having the turn table.

In one aspect of the present disclosure, there may be provided a turn table for a spindle motor, the turn table comprising: a clamping plate configured to have a locking protrusion protruding from an inner surface of a first recess thereof, the first recess being concavely formed in an outer circumference of the clamping plate; and a turn-table body configured to have a second recess to receive the clamping plate, and a plurality of protrusions protruding from an inner surface defined by the second recess towards the first recess to lock the locking protrusion.

In some exemplary of the present invention, the clamping plate may take a shape of a disc, and the first recess comprises three first recesses that are formed at regular intervals on the outer circumference of the clamping plate.

In some exemplary of the present invention, the plurality of protrusions may comprise: a first protrusion facing an upper surface of the locking protrusion; and a second protrusion facing a side surface of the locking protrusion to inhibit rotation of the clamping plate.

In some exemplary of the present invention, an upper surface of the second protrusion may be disposed to be lower than an upper surface of the first protrusion.

In some exemplary of the present invention, the upper surface of the second protrusion may be disposed under a lower surface of the first protrusion.

In some exemplary of the present invention, a thickness of the second protrusion may be set to allow the second protrusion to be elastically deformed.

In some exemplary of the present invention, a side surface of the locking protrusion facing the first protrusion may be formed to be inclined.

In some exemplary of the present invention, an escape space may be formed under the protrusions to receive the locking protrusion.

In some exemplary of the present invention, the plurality of protrusions may lock an upper surface and a side surface of the locking protrusion, respectively.

In other general aspect of the present disclosure, there may be provided a spindle motor, comprising: a bearing assembly configured to include a bearing and a housing for receiving the bearing; a stator secured to an outer circumference of the housing; a rotating shaft inserted into the bearing; a rotor coupled to the rotating shaft; and a turn table including: a clamping plate configured to have a locking protrusion protruding from an inner surface of a first recess thereof, the first recess being concavely formed in an outer circumference of the clamping plate; and a turn-table body configured to have a second recess to receive the clamping plate, and a plurality of protrusions protruding from an inner surface defined by the second recess towards the first recess to lock the locking protrusion.

In some exemplary of the present invention, the clamping plate may take a shape of a disc, and the first recess comprises three first recesses that are formed at regular intervals on the outer circumference of the clamping plate.

In some exemplary of the present invention, the plurality of protrusions may comprise: a first protrusion facing an upper surface of the locking protrusion; and a second protrusion facing a side surface of the locking protrusion to inhibit rotation of the clamping plate.

In some exemplary of the present invention, an upper surface of the second protrusion may be disposed to be lower than an upper surface of the first protrusion.

In some exemplary of the present invention, the upper surface of the second protrusion may be disposed under a lower surface of the first protrusion.

In some exemplary of the present invention, a thickness of the second protrusion may be set to allow the second protrusion to be elastically deformed.

In some exemplary of the present invention, a side surface of the locking protrusion facing the first protrusion may be formed to be inclined.

In some exemplary of the present invention, an escape space may be formed under the protrusions to receive the locking protrusion.

In another general aspect of the present disclosure, there may be provided a spindle motor, comprising: a bearing assembly configured to include a bearing and a housing for receiving the bearing; a stator secured to an outer circumference of the housing; a rotating shaft inserted into the bearing; a rotor coupled to the rotating shaft; and a turn table including: a clamping plate configured to have a locking protrusion protruding from an inner surface of a first recess thereof, the first recess being concavely formed in an outer circumference of the clamping plate; and a turn-table body configured to have a second recess to receive the clamping plate, and a plurality of protrusions protruding from an inner surface defined by the second recess towards the first recess to lock the locking protrusion, wherein the plurality of protrusions comprise: a first protrusion facing the upper surface of the locking protrusion; and a second protrusion facing the side surface of the locking protrusion to inhibit rotation of the clamping plate.

In some exemplary of the present invention, an upper surface of the second protrusion may be disposed to be lower than an upper surface of the first protrusion.

In some exemplary of the present invention, the upper surface of the second protrusion may be disposed under a lower surface of the first protrusion.

The present disclosure has an advantageous effect in that a locking protrusion provided on a clamping plate is locked using two protrusions provided in a clamp portion having a recess for receiving the clamping plate, thus inhibiting the clamping plate from being unexpectedly removed from the clamp portion.

DETAILED DESCRIPTION

Advantages and features of the present disclosure may be understood more readily by reference to the following detailed description of exemplary embodiments and the accompanying drawings. Thus, the present disclosure is not limited to the exemplary embodiments which will be described below, but may be implemented in other forms. Accordingly, the described aspect is intended to embrace all such alterations, modifications, and variations that fall within the scope and novel idea of the present disclosure.

Now, exemplary embodiments of the present disclosure will be described in detail with reference to the accompanying drawings.

Figure 1:
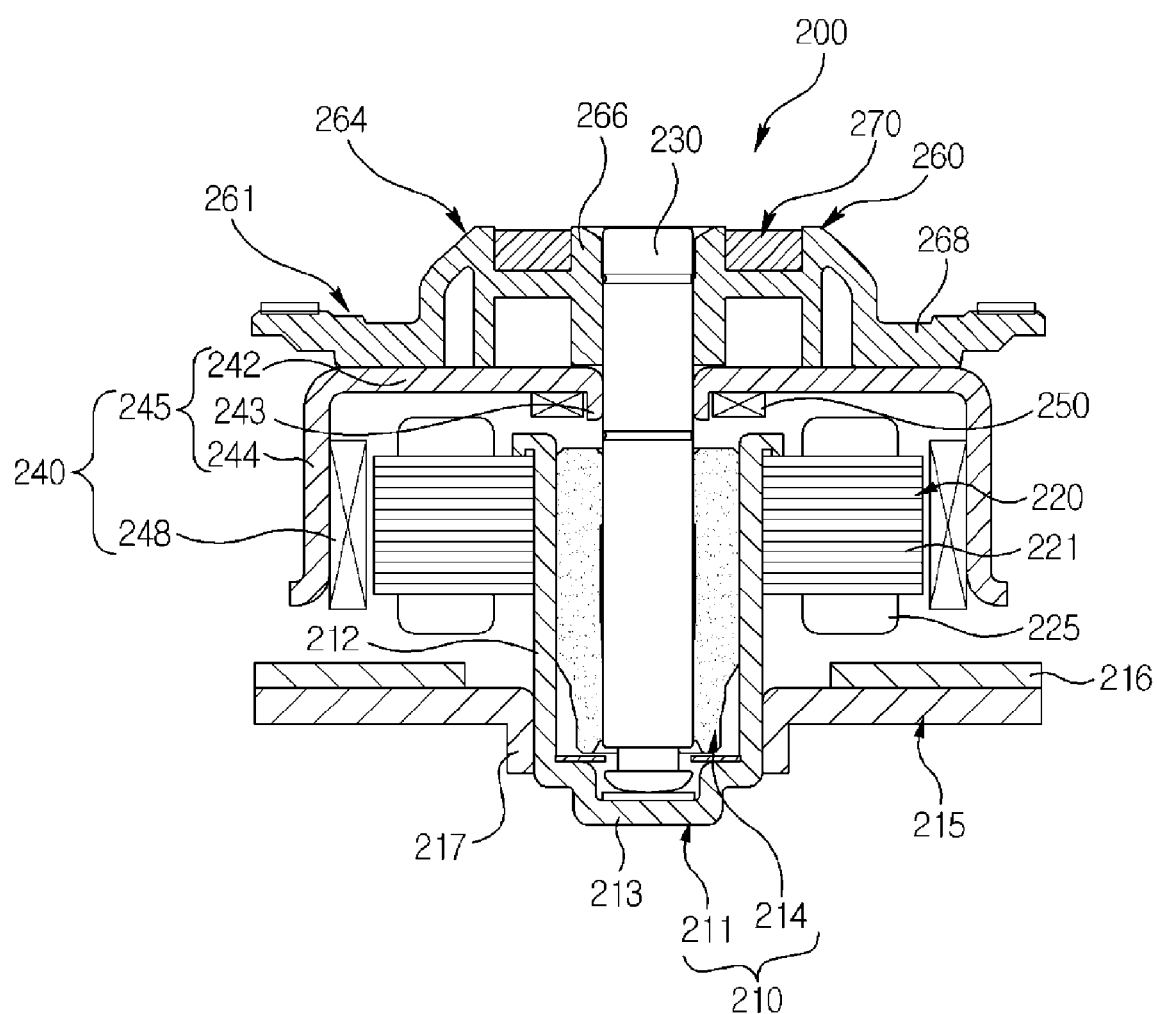
FIG. 1 is a sectional view showing a spindle motor in accordance with an embodiment of the present invention.

FIG. 1 is a sectional view showing a spindle motor in accordance with an embodiment of the present invention.

The spindle motor 200 includes a bearing assembly 210, a stator 220, a rotating shaft 230, a rotor 240, and a turn table 260. In addition to these components, the spindle motor 200 may further include a suction magnet 250, a base plate 215 and a circuit board 216.

The bearing assembly 210 includes a bearing housing 211 and a bearing 214.

The bearing housing 211 takes a shape of a cylinder that is open at a top thereof, and may be fabricated by pressing a metallic plate, for example. Otherwise, the bearing housing 211 may be formed using cast brass.

The bearing housing 211 taking the shape of the cylinder that is open at the top includes a side plate 212 and a bottom plate 213.

The side plate 212 of the bearing housing 211 is shaped like a cylinder, for example, and the bottom plate 213 is provided on a lower end of the side plate 212. According to an embodiment of the present invention, the side plate 212 and the bottom plate 213 may be integrated into a single structure by pressing.

An upper end of the side plate 212 of the bearing housing 211 is bent outwards from the side plate 212. A bent portion functions to fix a core of a stator 220 that will be described below.

The bearing 214 is received in a space defined in the bearing housing 211, and takes a shape of a cylinder having a shaft insertion hole into which a rotating shaft 230 is inserted. The bearing 214 may comprise, for example, an oil impregnated sintered bearing.

The bearing housing 211 of the bearing assembly 210 is coupled to the base plate 215. A burring portion 217 is formed on the base plate 215, and the side plate 212 of the bearing housing 211 is press-fitted into the burring portion 217. The circuit board 216 electrically connected to a coil of the stator 220 is disposed on an upper surface of the base plate 215.

The stator 220 includes a core 221 and a coil 225.

The core 221 is formed by stacking up a plurality of thin steel sheets, with a through hole being formed in a central portion of the core 221 to be coupled to the side plate 212 of the bearing housing 211.

The coil 225 is wound around the core 221, and generates a magnetic field as a driving signal is transmitted from the circuit board 216 to the coil 225 wound around the core 221.

An upper surface of the core 221 makes contact with the portion bent from the side plate 212 of the bearing housing 211. Hence, the core 221 is fixed to the side plate 212 of the bearing housing 211.

The rotating shaft 230 is rotatably supported in the shaft insertion hole of the bearing 214 received in the bearing housing 211.

The rotor 240 includes a yoke 245 and a magnet 248.

The yoke 245 takes a shape of a cylinder which is open at a bottom thereof. To be specific, the yoke 245 includes a top plate 242 and a side plate 244.

The top plate 242 of the yoke 245 is formed to take a shape of a thin disc, with a yoke burring portion 243 being formed on a central portion of the top plate 242. The yoke burring portion 243 is coupled to the rotating shaft 230. As the yoke burring portion 243 is coupled to the rotating shaft 230, the top plate 242 of the yoke 245 rotates along with the rotating shaft 230.

The side plate 244 of the yoke 245 extends from an outer edge of the top plate 242 to surround the stator 200.

The magnet 248 is disposed along an inner surface of the side plate 244 facing the core 221. The yoke 245 is rotated along with the rotating shaft 230 by attractive force or repulsive force between a magnetic field generated from the magnet 248 and a magnetic field generated from the coil 225 wound around the core 221.

The suction magnet 250 is disposed on an inner surface of the top plate 242 of the yoke 245 that faces the core 221. When viewed on a plane, the suction magnet 250 is shaped like a ring. The suction magnet 250 sucks the bearing housing 211 to inhibit the yoke 245 from floating.

Figure 2:
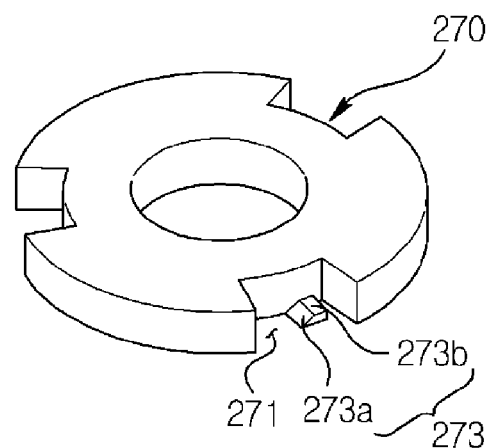
FIG. 2 is an exploded perspective view showing a turn table.
Figure 2:
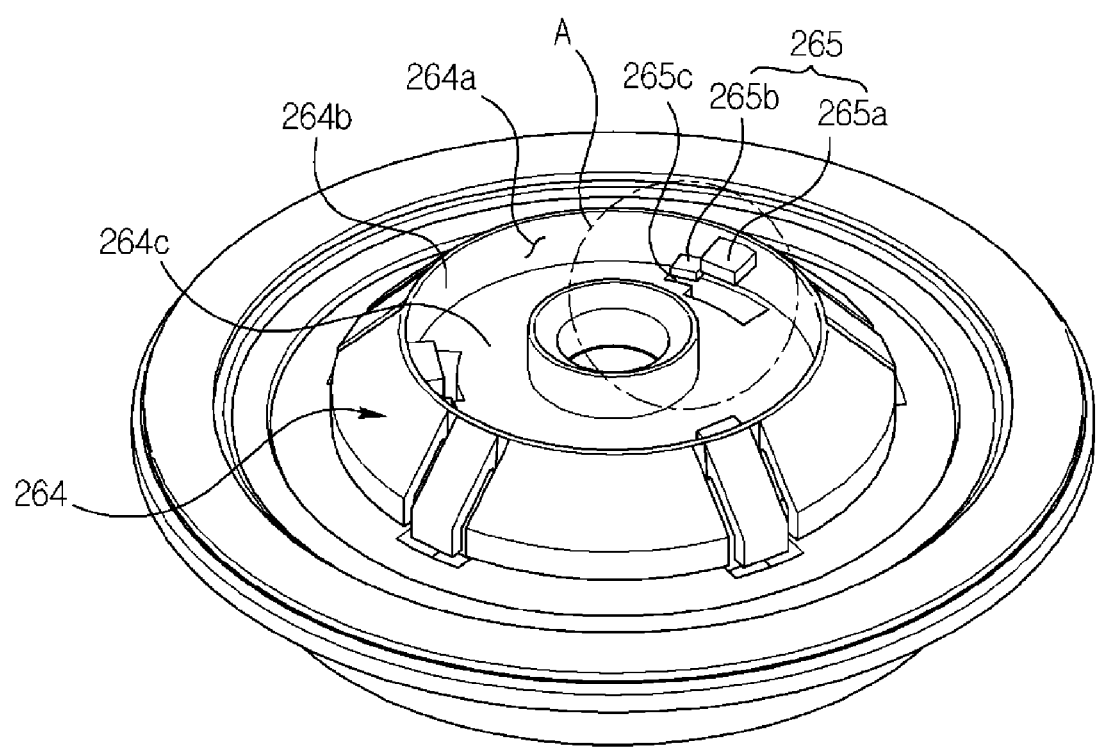
Figure 3:
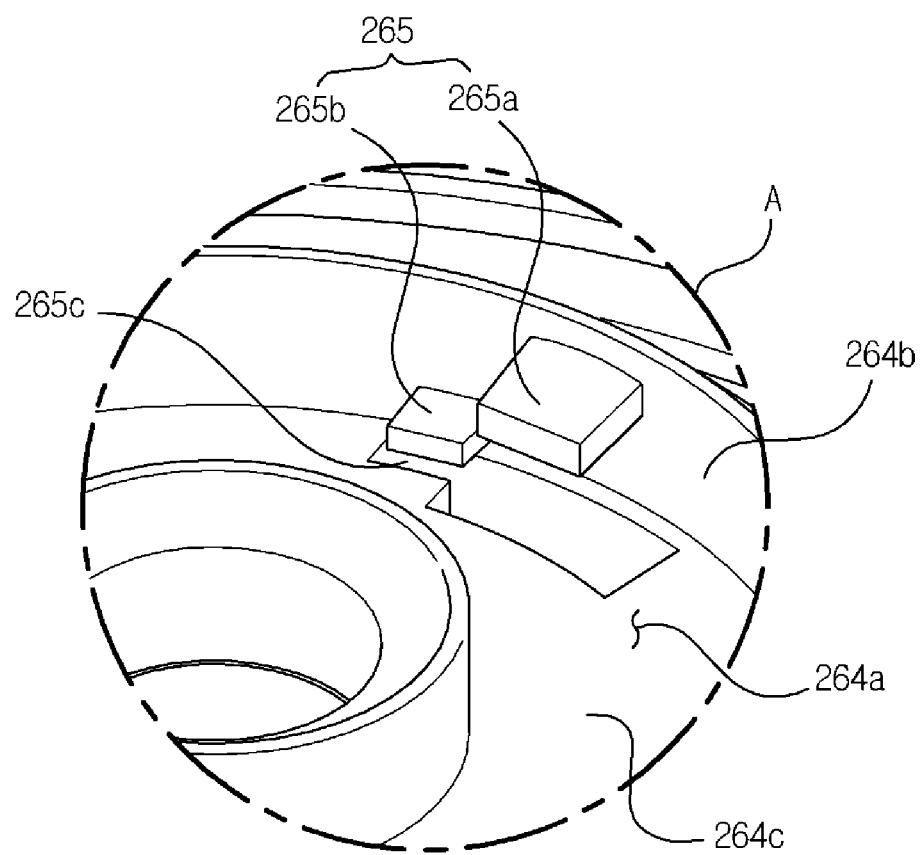
FIG. 3 is an enlarged view showing portion 'A' encircled in FIG. 2.

FIG. 2 is an exploded perspective view showing the turn table. FIG. 3 is an enlarged view showing portion 'A' encircled in FIG. 2.

The turn table 260 is placed on the top plate 242 of the yoke 245 and is coupled to the rotating shaft 230, so that the turn table 260 rotates along with the rotating shaft 230.

In an embodiment of the present invention, the turn table 260 includes a turn-table body 261 for fixing an optical disc and a clamping plate 270.

The clamping plate 270 takes a shape of a disc having inner and outer circumferences. A first recess 271 is concavely formed in a direction from the outer circumference to the inner circumference of the clamping plate 270.

According to an embodiment of the present invention, three first recesses 271 are formed at regular intervals. A locking protrusion 273 protrudes from a bottom facing the turn-table body 261 on an inner surface defined by each first recess 271. The locking protrusion 273 is formed in every first recess 271.

The clamping plate 270 may comprise a metallic plate, for example, to generate a suction force by interaction with the magnet. Alternatively, the clamping plate 270 may include a magnet.

The turn-table body 261 includes a clamp portion 264, a burring portion 266 and a support portion 268.

According to an embodiment of the present invention, the clamp portion 264 has a second recess 264a that is suitable to receive the clamping plate 270. The second recess 264a defines an inner surface 264b and a bottom surface 264c in the clamp portion 264. Here, the inner surface 264b faces the outer circumference of the clamping plate 270, and the bottom surface 264c faces a bottom of the clamping plate 270.

Protrusions 265 are formed on the inner surface 264b defined by the second recess 264a of the clamp portion 264. The protrusions 265 face an upper surface 273b and a side surface 273a of the locking protrusion 273 of the clamping plate 270, respectively.

The protrusions 265 are disposed to face the upper surface 273b and the side surface 273a of the locking protrusion 273 of the clamping plate 270, respectively, thus inhibiting the clamping plate 270 from being removed from the clamp portion 264 or being undesirably moved in the clamp portion 264.

The protrusions 265 comprise a first protrusion 265a and a second protrusion 265b.

The first protrusion 265a protrudes from the inner surface 264b of the clamp portion 264, and the second protrusion 265b is arranged to be parallel to the first protrusion 265a in such a way that the second protrusion 265b does not overlap the first protrusion 265a.

A lower surface of the first protrusion 265a is disposed to face or make contact with the upper surface of the locking protrusion 273, and the second protrusion 265b is disposed to face or make contact with the side surface of the locking protrusion 273.

The upper surface of the second protrusion 265b is disposed to be lower than the upper surface of the first protrusion 265a. The upper surface of the second protrusion 265b is disposed at a position corresponding to the lower surface of the first protrusion 265a, for example. The second protrusion 265b inhibits the clamping plate 270 from rotating.

Further, the first protrusion 265a is thick enough to inhibit its elastic deformation by an external force, whereas a thickness of the second protrusion 265b is set to allow the second protrusion 265b to be easily elastically deformed by an external force and restored to its original state.

Meanwhile, the lower surface of the second protrusion 265b and the bottom surface 264c of the clamp portion 264 corresponding to the lower surface of the second protrusion 265b have an escape space 265c to permit the elastic deformation of the second protrusion 265b, and an opening is formed through the bottom surface 264c at a position corresponding to the first protrusion 265a.

Figure 4:
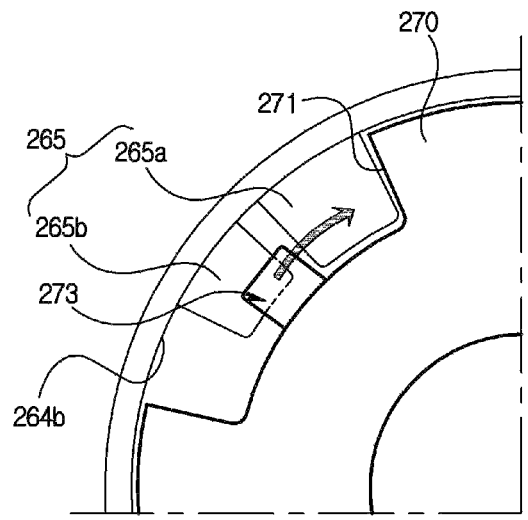
FIGS. 4 and 5 are plan views showing a process of assembling a clamping plate with a clamp portion, in accordance with an embodiment of the present invention.
Figure 5:
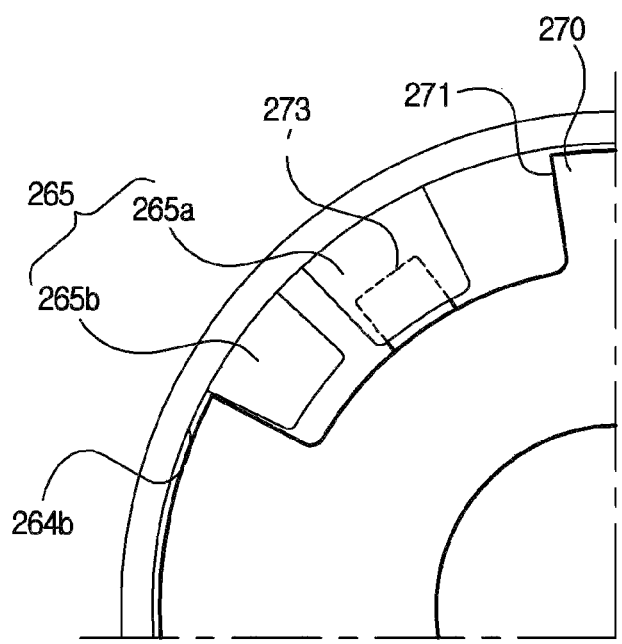

FIGS. 4 and 5 are plan views showing a process of assembling the clamping plate with the clamp portion according to an embodiment of the present invention.

Referring to FIG. 4, in order to assemble the clamping plate with the clamp portion, the locking protrusion 273 formed in the first recess 271 of the clamping plate 270 is placed above the second protrusion 265b, and force is applied to the clamping plate 270 towards the bottom surface 264c of the clamp portion 264. Therefore, the second protrusion 265b is elastically deformed towards the bottom surface 264c, thus causing the upper surface 273b of the locking protrusion 273 to move under the lower surface of the first protrusion 265a.

After the upper surface 273b of the locking protrusion 273 has moved under the lower surface of the first protrusion 265a, the upper surface 273b of the locking protrusion 273 moves to the lower surface of the first protrusion 265a.

Referring to FIG. 5, as the upper surface 273b of the locking protrusion 273 moves to the lower surface of the first protrusion 265a, the second protrusion 265b elastically deformed by the locking protrusion 273 returns to its original position. Thereby, the locking protrusion 273 is disposed between the first protrusion 265a and the second protrusion 265b. Consequently, the locking protrusion 273 is not removed from the clamp portion 264 by the first and second protrusions 265a and 265b.

According to an embodiment of the present invention, among the side surfaces of the locking protrusion 273, a side surface facing the first protrusion 265a is formed to be inclined, thus allowing the locking protrusion 273 to more easily slide to the lower surface of the first protrusion 265a.

As described above, the present invention provides a turn table for a spindle motor and a spindle motor having the turn table, in which a locking protrusion provided on a clamping plate is locked using two protrusions provided in a clamp portion having a recess for receiving the clamping plate, thus inhibiting the clamping plate from being unexpectedly removed from the clamp portion.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A turn table for a spindle motor, comprising:
   a clamping plate having inner and outer circumferences, wherein the clamping plate is formed a first recess concavely formed between the outer circumference and the inner circumference, and having a locking protrusion protruding from an inner circumference of the first recess; and
   a turn-table body having a second recess to receive the clamping plate and a plurality of protrusions protruding from an inner surface defined by the second recess towards the first recess of the clamping plate to be received;
   wherein the plurality of protrusions comprises:
      a first protrusion facing an upper surface of the locking protrusion, and
      a second protrusion arranged to be parallel to the first protrusion and facing a side surface of the locking protrusion to inhibit a rotation of the clamping plate; and
   wherein the locking protrusion of the clamping plate is disposed under the first protrusion after the locking protrusion moves over the second protrusion that is configured to be elastically deformed, to lock the clamping plate.

2. The turn table of claim 1, wherein the clamping plate takes a shape of a disc, and the first recess comprises three first recesses that are formed at regular intervals on the outer circumference of the clamping plate.

3. The turn table of claim 1, wherein an upper surface of the second protrusion is disposed to be lower than an upper surface of the first protrusion.

4. The turn table of claim 1, wherein an upper surface of the second protrusion is disposed under a lower surface of the first protrusion.

5. The turn table of claim 1, wherein a thickness of the second protrusion is set to allow the second protrusion to be elastically deformed.

6. The turn table of claim 1, wherein a side surface of the locking protrusion facing the first protrusion is formed to be inclined.

7. The turn table of claim 1, wherein an escape space is formed under the plurality of protrusions to receive the locking protrusion.

8. The turn table of claim 1, wherein the plurality of protrusions lock an upper surface and a side surface of the locking protrusion, respectively.

9. A spindle motor, comprising:
 a bearing assembly configured to include a bearing and a housing for receiving the bearing;
 a stator secured to an outer circumference of the housing;
 a rotating shaft inserted into the bearing;
 a rotor coupled to the rotating shaft; and
 a turn table including:
 a clamping plate having inner and outer circumferences, wherein the clamping plate is formed with a first recess concavely formed between the outer circumference and the inner circumference, and having a locking protrusion protruding from an inner circumference of the first recess; and
 a turn-table body having a second recess to receive the clamping plate and a plurality of protrusions protruding from an inner surface defined by the second recess towards the first recess of the clamping plate to be received;
 wherein the plurality of protrusions comprises:
 a first protrusion facing an upper surface of the locking protrusion, and
 a second protrusion arranged to he parallel to the s protrusion and facing a side surface of the locking protrusion to inhibit a rotation of the clamping plate; and
 Wherein the locking protrusion of the clamping plate is disposed under the first protrusion after the locking protrusion Moves over the second protrusion that is configured to be elastically deformed, to lock the clamping plate.

10. The spindle motor of claim 9, wherein the clamping plate takes a shape of a disc, and the first recess comprises three first recesses that are formed at regular intervals on the outer circumference of the clamping plate.

11. The spindle motor of claim 9, wherein an upper surface of the second protrusion is disposed to be lower than an upper surface of the first protrusion.

12. The spindle motor of claim 9, wherein an upper surface of the second protrusion is disposed under a lower surface of the first protrusion.

13. The spindle motor of claim 9, wherein a thickness of the second protrusion is set to allow the second protrusion to be elastically deformed.

14. The spindle motor of claim 9, wherein a side surface of the locking protrusion facing the first protrusion is formed to be inclined.

15. The spindle motor of claim 9, wherein an escape space is formed under the plurality of protrusions to receive the locking protrusion.

* * * * *